US009257206B2

(12) United States Patent
Stoner et al.

(10) Patent No.: US 9,257,206 B2
(45) Date of Patent: Feb. 9, 2016

(54) ADIABATIC RAPID PASSAGE ATOMIC BEAMSPLITTER USING FREQUENCY-SWEPT COHERENT LASER BEAM PAIRS

(71) Applicant: The Charles Stark Draper Laboratory, Inc., Cambridge, MA (US)

(72) Inventors: Richard E. Stoner, Framingham, MA (US); Joseph M. Kinast, Cambridge, MA (US); Brian P. Timmons, Milford, MA (US)

(73) Assignee: THE CHARLES STARK DRAPER LABORATORY, INC., Cambridge, MA (US)

(*) Notice: Subject to any disclaimer, the term of this patent is extended or adjusted under 35 U.S.C. 154(b) by 0 days.

(21) Appl. No.: 13/688,429

(22) Filed: Nov. 29, 2012

(65) Prior Publication Data

US 2013/0168541 A1    Jul. 4, 2013

Related U.S. Application Data

(60) Provisional application No. 61/566,209, filed on Dec. 2, 2011.

(51) Int. Cl.
*H05H 3/02* (2006.01)
*G21K 1/00* (2006.01)
*G01V 7/00* (2006.01)

(52) U.S. Cl.
CPC *G21K 1/006* (2013.01); *G01V 7/00* (2013.01); *G21K 1/003* (2013.01); *H05H 3/02* (2013.01)

(58) Field of Classification Search
CPC .......... G21K 1/006; G21K 5/00; G21K 5/04
USPC .......... 250/251, 492.1, 493.1, 494.1; 372/9, 372/25, 26, 27
See application file for complete search history.

(56) References Cited

U.S. PATENT DOCUMENTS

| | | | | | |
|---|---|---|---|---|---|
| 5,004,325 | A | * | 4/1991 | Glass et al. | 359/241 |
| 5,274,231 | A | * | 12/1993 | Chu et al. | 250/251 |
| 5,274,232 | A | * | 12/1993 | Chu et al. | 250/251 |
| 6,042,603 | A | * | 3/2000 | Fisher et al. | 607/89 |

OTHER PUBLICATIONS

Peik et al., "Bloch oscillations of atoms, adiabatic rapid passage, and monokinetic atomic beams", Physical Review A, vol. 55, No. 4, Apr. 1997.*
Butts, David L. et al., "Light Pulse Atom Interfermometry at Short Interrogation Times", Journal of the Optical Society of America, vol. 28, No. 3, Mar. 2011, pp. 416-421.
Butts, David L., et al., "Coherent Population Trapping in Raman-Pulse Atom Interferometry", Physical Review A vol. 84 No. 4, 2011, pp. 043613-1-043613-8.

(Continued)

*Primary Examiner* — Michael Logie
(74) *Attorney, Agent, or Firm* — Lando & Anastasi, LLP

(57) ABSTRACT

Methods and apparatus for providing coherent atom population transfer using coherent laser beam pairs in which the frequency difference between the beams of a pair is swept over time. Certain examples include a Raman pulse adiabatic rapid passage sweep regimen configured to be used as a beamsplitter and combiner in conjunction with an adiabatic rapid passage mirror sweep or a standard Raman mirror pulse in a 3-pulse interferometer sequence.

16 Claims, 7 Drawing Sheets

(56) References Cited

OTHER PUBLICATIONS

Kotru, Krish et al., "Atom Interferometry via Raman Chirped Adiabatic Passage", CLEO Technical Digest, 2012, 2pgs.

Stoner, Richard et al., "Analytical Framework for Dynamic Light Pulse Atom Interferometry at Short Interrogation Times", Journal of the Optical Society of America, vol. 28, No. 10, Oct. 2011, pp. 2418-2429.

Timmons, Brian et al., "Radiation Exposure of Distributed-Feedback Lasers for Use in Atom Trapping and Atom Interferometry", IEEE Transactions on Nuclear Science, vol. 58, No. 2, Apr. 2011, pp. 490-498.

Band, Y. et al., "Chirped-Light-Field Atomic-Beam Splitter for Atom Interferometry", Physical Review A, vol. 47, No. 6, Jun. 1993.

Chelkowski, S. et al., "Raman Chirped Adiabatic Passage: a New Method for Selective Excitation of High Vibrational States", Journal of Raman Spectroscopy, vol. 28, pp. 459-466, 1997.

Malinovsky, V.S. et al., "General Theory of Population Transfer by Adiabatic Rapid Passage with Intense, Chirped Laser Pulses", The European Physical Journal, vol. 14, No. 2, pp. 147-155, May 1, 2001.

Pfeifer, Thomas et al., "Heterodyne Mixing of Laser Fields for Temporal Gating of High-Order Harmonic Generation", Physical Review Letters, vol. 97, No. 16, Oct. 16, 2006.

Pfeifer, Thomas et al., "Time-Resolved Spectroscopy of Attosecond Quantum Dynamics", Chemical Physical Letters, Elsevier vol. 463, Nos. 1-3, pp. 11-24, Sep. 22, 2008.

Raith, Philipp et al., "Attosecond Twin-Pulse Control by Generalized Kinetic Heterodyne Mixing", Optical Letters, vol. 36, No. 2, Jan. 15, 2011, pp. 283-285.

Kovachy, T., et al., "Adiabatic-Rapid-Passage Multiphoton Bragg Atom Optics," Phys. Rev. A 86, 011606(R), Jul. 20, 2012, pp. 011606-1-011606-5.

Bateman, James, et al., "Fractional Adiabatic Passage in Two-Level Systems: Mirrors and Beam Splitters for Atomic Interferometry," The American Physical Society, Physical Review A 76, 013416 (2007), pp. 013416-1-013416-9.

PCT/US2012/066973, International Preliminary Report on Patentability, dated Jun. 3, 2014.

PCT/US2012/066973, Written Opinion, dated Jun. 2, 2014.

\* cited by examiner

ADIABATIC RAPID PASSAGE ATOMIC BEAMSPLITTER USING FREQUENCY-SWEPT COHERENT LASER BEAM PAIRS

CROSS REFERENCE TO RELATED APPLICATIONS

This application claims the benefit under 35 U.S.C. §119(e) of U.S. Provisional Application No. 61/566,209 filed Dec. 2, 2011 and titled "FREQUENCY-SWEPT COHERENT LASER BEAM PAIRS AS ADIABATIC RAPID PASSAGE ATOMIC BEAMSPLITTERS," which is incorporated herein by reference in its entirety.

BACKGROUND

Atom interferometry provides a useful tool for precision measurements in geodesy, inertial navigation, and fundamental physics. In light-pulse atom interferometers, stimulated Raman transitions commonly provide the atom optics that coherently split, reflect, and recombine atom wavepackets. U.S. Pat. Nos. 5,274,231 and 5,274,232, each of which is herein incorporated by reference in its entirety, disclose examples of methods and apparatus for manipulating quantum objects, such as atoms, using stimulated Raman transitions. The conventional Raman beamsplitter implementation, which uses resonant pulses to drive atomic transitions, is sensitive to variations in the intensity and difference frequency of the Raman optical fields. These variations can be minimized in a laboratory setting, but will be unavoidably larger in dynamic environments, degrading the performance of practical sensors. In addition, Raman pulses are limited in the thermal velocity range of atoms that can be effectively addressed.

Adiabatic rapid passage (ARP; also known as adiabatic fast passage (AFP)) is a technique used in nuclear magnetic resonance (NMR) to produce rotation of the macroscopic magnetization vector by shifting the frequency of radio frequency (RF) energy pulses (or the strength of the magnetic field) through resonance (the Larmor frequency) in a time that is short compared to the relaxation times. Rather than applying an RF tipping field of fixed orientation and magnitude orthogonal to the holding magnetic field, a field of variable direction is initially applied parallel to an initial polarization and swept into the desired orientation. The polarization is "dragged" while preserving its relative orientation angle with the RF field if the sweep occurs on a timescale much longer than a period of precession about the RF field. One method of varying the RF tipping field direction is by sweeping the RF frequency, as discussed, for example, in U.S. Pat. No. 4,695,799. U.S. Pat. No. 4,695,799 discloses various frequency sweep regimens in the context of NMR.

An optical beamsplitter method using adiabatic rapid passage is discussed in *Atomic interferometer based on adiabatic population transfer*, Weitz et al., Phys. Rev. Lett. Vol. 73, pp 2563-2566 (1994), and in Precision atom interferometry with light pulses, B. Young et al., in *Atom Interferometry*, ed. P. Berman (Academic Press, 1996), p. 363. In this method, a pair of laser beams with a fixed laser frequency difference, but having variable laser beam power, was used to achieve atomic population transfer.

SUMMARY OF THE INVENTION

Aspects and embodiments are directed to methods and apparatus for providing coherent atom population transfer using coherent laser beam pairs in which the frequency difference between the beams of a pair is swept over time. In particular, aspects and embodiments include a Raman adiabatic rapid passage (ARP) sweep regimen using characteristic detunings and laser powers used in standard Raman pulse beamsplitters. As discussed and demonstrated below, atom interferometers can be composed of a sequence of ARP sweeps. Atom interferometers can also be composed of a combination of ARP sweeps and standard Raman pulses. In one example of such a combination sequence, ARP sweeps can be used as a beamsplitter and combiner in conjunction with a standard Raman mirror pulse in a 3-pulse interferometer sequence. Atom interferometers using ARP sweeps may achieve greatly reduced sensitivity to detuning and AC Stark shifts as compared to standard Raman interferometers.

According to one embodiment, a method for controllably translating a quantum object such as an atom comprises mixing at least two electromagnetic waves of at least first and second time-varying frequencies to produce coherent electromagnetic energy of a third time-varying frequency, and applying and directing the coherent electromagnetic energy in pulse form of preselected area, duration, polarization, and time-dependent frequency profile at the quantum object thereby inducing transitions between two distinct internal levels of the quantum object to change momentum of the quantum object.

In one example of such a method, mixing the at least two electromagnetic waves includes heterodyning a pair of electromagnetic waves with a time-varying frequency difference to produce the coherent electromagnetic energy and to effect adiabatic Raman transitions between the two distinct quantum levels in the quantum object. The method may further comprise, after the applying and directing step, observing the internal quantum state of the quantum object to determine the momentum and thereby to ascertain velocity of the quantum object. The method may further comprise directing the at least two electromagnetic waves along a collinear path to the quantum object. In one example applying the coherent electromagnetic energy includes applying the coherent electromagnetic energy in temporal pulse form to the quantum object. In another example the quantum object is substantially stationary relative to the position of the coherent electromagnetic energy. The method may comprise cooling the quantum object to render the quantum object substantially stationary. In one example, the pulse form of the coherent electromagnetic energy comprises a frequency difference variation from a very large positive or negative value, to a value close to a resonance with a quantum state transition between the two distinct quantum states, thereby to produce an atomic analog of an optical beam splitter for the quantum object when that quantum object initially occupies one of those two distinct quantum states. In another example, the pulse form of the coherent electromagnetic energy comprises a frequency difference variation from a value close to a resonance with a quantum state transition between two distinct quantum states, to a very large positive or negative value, thereby to produce an atomic analog of an optical beam combiner for the quantum object when that quantum object initially occupies a coherent superposition of the two distinct quantum states. In another example, the pulse form of the coherent electromagnetic energy comprises a frequency difference variation from a very large positive or negative value, to a very large negative or positive value, respectively, compared to the resonance with a quantum state transition between two distinct quantum states, thereby to effect a transition from one to the other distinct quantum state when that quantum object initially occupies one of two distinct quantum states. In another example, the pulse form of the coherent electromagnetic energy comprises a frequency difference variation: from a very large positive or negative value, to a value close to a resonance with a quantum state transition between two distinct quantum states; a change of π in the phase of the difference frequency signal; and then back to a value close to a very large positive or negative value, respectively, compared to the resonance with a quantum state transition between two distinct quantum states, thereby to produce an atomic analog of an optical mirror for the quantum object when that quantum object initially comprises a superposition of those two distinct quantum states.

According to another embodiment, a method for measuring changes in the velocity of a quantum object comprises steps of: (a) providing an ensemble of quantum objects of a first preselected velocity range by preparing an ensemble of quantum objects of a first internal state; (b) thereafter inducing transitions between distinct internal levels of selected ones of the quantum objects by applying first coherent electromagnetic energy in pulse form of a first preselected pulse area, a first duration, a first polarization, and a first frequency difference sweep range, the first coherent electromagnetic energy being generated by the mixing of at least two electromagnetic waves of the first frequency difference sweep range, the first coherent electromagnetic energy being directed at the ensemble of quantum objects to excite quantum objects within the ensemble; (c) thereafter inducing transitions between distinct internal levels of quantum objects of the ensemble by applying second coherent electromagnetic energy in pulse form of a second preselected pulse area, a second duration, a second polarization, and a second frequency difference sweep range, the second coherent electromagnetic energy being generated by the mixing of at least two electromagnetic waves of preselected frequencies, the second coherent electromagnetic energy being directed at the ensemble of quantum objects to excite the quantum objects within the ensemble; (d) thereafter inducing transitions between internal levels of quantum objects of the ensemble by applying third coherent electromagnetic energy in pulse form of a third preselected area, a third duration, third polarization, and a third frequency difference sweep range, the third coherent electromagnetic energy being generated by the mixing of at least two electromagnetic waves of the third frequency difference sweep range, the third coherent electromagnetic energy being directed at the ensemble of quantum objects to excite quantum objects within the ensemble; and (e) thereafter observing the internal states of the quantum object to reach a conclusion about a change in velocity of the quantum objects induced by external force.

In one example of such a method, the first pulse comprises a frequency difference variation from a very large positive or negative value, to a value close to a resonance with a quantum state transition between the two distinct quantum states, thereby to produce an atomic analog of an optical beamsplitter for the quantum object when that quantum object initially occupies one of those two distinct quantum states and to cause the quantum object in an internal quantum state |1> to transition to a substantially equal coherent superposition of states |1> and |2>. The second pulse comprises a frequency difference variation: from a very large positive or negative value, to a value close to a resonance with a quantum state transition between two distinct quantum states; a change of π in the phase of the difference frequency signal; and then back to a value close to a very large positive or negative value, respectively, compared to the resonance with a quantum state transition between two distinct quantum states, thereby to induce a transition from internal quantum state |1> to internal quantum state |2> with substantially 100% probability, and to cause a transition from internal quantum state |2> to internal quantum state |1> with substantially 100% probability. The third pulse comprises a frequency difference variation from a value close to a resonance with a quantum state transition between two distinct quantum states, to a very large positive or negative value, thereby to produce an atomic analog of an optical beam combiner for the quantum object when that quantum object initially occupies a coherent superposition of the two distinct quantum states, such that the step (d) operates to coherently discriminate the internal quantum states of the quantum object under observation.

According to another embodiment, a method for measuring changes in the velocity of a quantum object comprises steps of (a) providing an ensemble of quantum objects of a first preselected velocity range by preparing an ensemble of quantum objects of a first internal state; (b) thereafter inducing transitions between distinct internal levels of selected ones of the quantum objects by applying first coherent electromagnetic energy in pulse form of a first preselected pulse area, a first duration, a first polarization, and a first frequency difference sweep range, the first coherent electromagnetic energy being generated by the mixing of at least two electromagnetic waves of the first frequency difference sweep range, the first coherent electromagnetic energy being directed at the ensemble of quantum objects to excite quantum objects within the ensemble; (c) thereafter inducing transitions between distinct internal levels of quantum objects of the ensemble by applying second coherent electromagnetic energy in pulse form of a second preselected area, second duration and second polarization, and a fixed frequency difference, the second coherent electromagnetic energy being generated by the mixing of at least two electromagnetic waves of preselected frequencies, the second coherent electromagnetic energy being directed at the ensemble of quantum objects to excite the quantum objects within the ensemble; (d) thereafter inducing transitions between internal levels of quantum objects of the ensemble by applying third coherent electromagnetic energy in pulse form of a third preselected area, third duration, third polarization, and a third frequency difference sweep range, the third coherent electromagnetic energy being generated by the mixing of at least two electromagnetic waves of the third frequency difference sweep range, the third coherent electromagnetic energy being directed at the ensemble of quantum objects to excite quantum objects within the ensemble; and (e) thereafter observing the internal states of the quantum object to reach a conclusion about a change in velocity of the quantum objects induced by external force.

In one example of such a method, the first pulse comprises a frequency difference variation from a very large positive or negative value, to a value close to a resonance with a quantum state transition between the two distinct quantum states, thereby to produce an atomic analog of an optical beamsplitter for the quantum object when that quantum object initially occupies one of those two distinct quantum states and to cause the quantum object in an internal quantum state |1> to transition to a substantially equal coherent superposition of states |1> and |2>. The second fixed frequency difference pulse has a quantum area of substantially π, thereby to cause a resonant transition from internal quantum state |1> to internal quantum state |2> with substantially 100% probability, and to cause a transition from internal quantum state |2> to internal quantum state |1> with substantially 100% probability, and the third pulse comprises a frequency difference variation from a value close to a resonance with a quantum state transition between two distinct quantum states, to a very large positive or negative value, thereby to produce an atomic analog of an optical beam combiner for the quantum object when that quantum object initially occupies a coherent superposition of the two distinct quantum states, such that the step (d) operates to coherently discriminate the internal quantum states of the quantum object under observation.

Another embodiment is directed to a method for measuring gravitational acceleration of a quantum object. The method may comprise steps of: (a) providing an ensemble of quantum objects of a first preselected velocity range by preparing an ensemble of quantum objects of a first internal state with a mean velocity being directed substantially vertically and thereby substantially parallel to gravitational force; (b) thereafter inducing transitions between distinct internal levels of selected ones of the quantum objects by applying first coherent electromagnetic energy in pulse form of a first preselected area, first duration, a first polarization, and a first frequency difference sweep range, the first coherent electromagnetic energy being directed substantially vertically and thereby substantially parallel to gravitational force at the ensemble of quantum objects to excite quantum objects within the ensemble; (c) thereafter inducing transitions between distinct internal levels of quantum objects of the ensemble by applying second coherent electromagnetic energy in pulse form of a second preselected area, a second duration, a second polarization, and a second frequency difference sweep range, the second coherent electromagnetic energy being generated by the mixing of at least two electromagnetic waves of preselected frequencies, the second coherent electromagnetic energy being directed substantially vertically and thereby substantially parallel to gravitational force at the ensemble of quantum objects to excite the quantum objects within the ensemble; (d) thereafter inducing transitions between internal levels of quantum objects of the ensemble by applying third coherent electromagnetic energy in pulse form of a third preselected area, a third duration, third polarization, and a third frequency difference sweep range, the third coherent electromagnetic energy being generated by the mixing of at least two electromagnetic waves of third frequency difference sweep range, the third coherent electromagnetic energy being directed at the ensemble of quantum objects to excite quantum objects within the ensemble; and (e) thereafter observing the internal states of the quantum object to reach a conclusion about a change in velocity of the quantum objects induced by external force.

In one example of such a method, the first pulse comprises a frequency difference variation from a very large positive or negative value, to a value close to a resonance with a quantum state transition between the two distinct quantum states, thereby to produce an atomic analog of an optical beamsplitter for the quantum object when that quantum object initially occupies one of those two distinct quantum states and to cause the quantum object in an internal quantum state $|1\rangle$ to transition to a substantially equal coherent superposition of states $|1\rangle$ and $|2\rangle$. The second pulse comprises a frequency difference variation: from a very large positive or negative value, to a value close to a resonance with a quantum state transition between two distinct quantum states; a change of $\pi$ in the phase of the difference frequency signal; and then back to a value close to a very large positive or negative value, respectively, compared to the resonance with a quantum state transition between two distinct quantum states, thereby to induce a transition from internal quantum state $|1\rangle$ to internal quantum state $|2\rangle$ with substantially 100% probability, and to cause a transition from internal quantum state $|2\rangle$ to internal quantum state $|1\rangle$ with substantially 100% probability. The third pulse comprises a frequency difference variation from a value close to a resonance with a quantum state transition between two distinct quantum states, to a very large positive or negative value, thereby to produce an atomic analog of an optical beam combiner for the quantum object when that quantum object initially occupies a coherent superposition of the two distinct quantum states, such that the step (d) operates to coherently discriminate the internal quantum states of the quantum object under observation.

Another embodiment is directed to a method for measuring gravitational acceleration of a quantum object. The method may comprise steps of (a) providing an ensemble of quantum objects of a first preselected velocity range by preparing an ensemble of quantum objects of a first internal state with a mean velocity being directed substantially vertically and thereby substantially parallel to gravitational force; (b) thereafter inducing transitions between distinct internal levels of selected ones of the quantum objects by applying first coherent electromagnetic energy in pulse form of a first pulse area, a first duration, a first polarization, and a first frequency difference sweep range, the first coherent electromagnetic energy being directed substantially vertically and thereby substantially parallel to gravitational force at the ensemble of quantum objects to excite quantum objects within the ensemble; (c) thereafter inducing transitions between distinct internal levels of quantum objects of the ensemble by applying second coherent electromagnetic energy in pulse form of a second preselected area, second duration and second polarization, and a fixed frequency difference, the second coherent electromagnetic energy being generated by the mixing of at least two electromagnetic waves of preselected frequencies, the second coherent electromagnetic energy being directed substantially vertically and thereby substantially parallel to gravitational force at the ensemble of quantum objects to excite the quantum objects within the ensemble; (d) thereafter inducing transitions between internal levels of quantum objects of the ensemble by applying third coherent electromagnetic energy in pulse form of a third preselected area, third duration, third polarization, and a third frequency difference sweep range, the third coherent electromagnetic energy being generated by the mixing of at least two electromagnetic waves of third frequency difference sweep range, the third coherent electromagnetic energy being directed at the ensemble of quantum objects to excite quantum objects within the ensemble; and (e) thereafter observing the internal states of the quantum object to reach a conclusion about a change in velocity of the quantum objects induced by external force.

In one example of such a method, the first pulse comprises a frequency difference variation from a very large positive or negative value, to a value close to a resonance with a quantum state transition between the two distinct quantum states, thereby to produce an atomic analog of an optical beamsplitter for the quantum object when that quantum object initially occupies one of those two distinct quantum states and to cause the quantum object in an internal quantum state $|1\rangle$ to transition to a substantially equal coherent superposition of states $|1\rangle$ and $|2\rangle$. The second fixed frequency difference pulse has a quantum area of substantially $\pi$, thereby to cause a resonant transition from internal quantum state $|1\rangle$ to internal quantum state $|2\rangle$ with substantially 100% probability, and to cause a transition from internal quantum state $|2\rangle$ to internal quantum state $|1\rangle$ with substantially 100% probability, and the third pulse comprises a frequency difference variation from a value close to a resonance with a quantum state transition between two distinct quantum states, to a very large positive or negative value, thereby to produce an atomic analog of an optical beam combiner for the quantum object when that quantum object initially occupies a coherent superposition of the two distinct quantum states, such that the step (d) operates to coherently discriminate the internal quantum states of the quantum object under observation.

According to another embodiment, an apparatus for controllably translating a quantum object such as an atom comprises structure for mixing at least two electromagnetic waves of at least first and second time-varying frequencies to produce coherent electromagnetic energy of a third time varying frequency, and structure coupled with the mixing structure for applying and directing the coherent electromagnetic energy in pulse form of preselected area, duration, polarization, and time dependent frequency profile, at the quantum object inducing transitions between two distinct internal levels of the quantum object to change momentum of the quantum object.

In one example the inducing structure comprises a mechanism for generating two electromagnetic waves of a time dependent frequency profile to heterodyne to produce the coherent electromagnetic energy to effect adiabatic Raman transitions in the quantum object. The apparatus may further include a mechanism for observing the internal quantum state of the quantum object to determine the momentum and thereby to ascertain velocity of the quantum object. The transition inducing mechanism may comprise structure for directing the two electromagnetic waves along a collinear path to the quantum object. The transition inducing mechanism may include structure for applying the coherent electromagnetic energy in temporal pulse form to the quantum object. In one example the pulse form of the coherent electromagnetic energy comprises a frequency difference variation from a very large positive or negative value, to a value close to a resonance with a quantum state transition between two distinct quantum states, thereby to produce an atomic analog of an optical beam splitter for the quantum object when that quantum object initially occupies one of those two distinct quantum states. In another example, the pulse form of the coherent electromagnetic energy comprises a frequency difference variation from a value close to a resonance with a quantum state transition between two distinct quantum states, to a very large positive or negative value, thereby to produce an atomic analog of an optical beam combiner for the quantum object when that quantum object initially occupies a coherent superposition of the two distinct quantum states. In another example the pulse form of the coherent electromagnetic energy comprises a frequency difference variation from a very large positive or negative value, to a very large negative or positive value, respectively, compared to the resonance with a quantum state transition between two distinct quantum states, thereby to effect a transition from one to the other distinct quantum state when that quantum object initially occupies one of two distinct quantum states. In another example, the pulse form of the coherent electromagnetic energy comprises a frequency difference variation from a value close to a resonance with a quantum state transition between two distinct quantum states, to a very large positive or negative value, thereby to produce an atomic analog of an optical beam combiner for the quantum object when that quantum object initially occupies a coherent superposition of the two distinct quantum states. In another example, the pulse form of the coherent electromagnetic energy comprises a frequency difference variation: from a very large positive or negative value, to a value close to a resonance with a quantum state transition between two distinct quantum states; a change of $\pi$ in the phase of the difference frequency signal; and then back to a value close to a very large positive or negative value, respectively, compared to the resonance with a quantum state transition between two distinct quantum states, thereby to produce an atomic analog of an optical mirror for the quantum object when that quantum object initially comprises a superposition of those two distinct quantum states.

According to another embodiment, an apparatus for measuring gravitational acceleration of a quantum object comprises (a) structure for providing an ensemble of quantum objects of a first preselected velocity range by preparing an ensemble of quantum objects of a first internal state with a mean velocity being directed substantially vertically and thereby substantially parallel to gravitational force; (b) a mechanism for thereafter inducing transitions between distinct internal levels of selected ones of the quantum objects by applying first coherent electromagnetic energy in pulse form of a first pulse area, a first duration, a first polarization, and a first frequency difference sweep range, the first coherent electromagnetic energy being directed substantially vertically and thereby substantially parallel to gravitational force at the ensemble of quantum objects to excite quantum objects within the ensemble; (c) a mechanism for thereafter inducing transitions between distinct internal levels of quantum objects of the ensemble by applying second coherent electromagnetic energy in pulse form of a second preselected area, second duration and second polarization, and a second frequency difference sweep range, the second coherent electromagnetic energy being generated by the mixing of at least two electromagnetic waves of preselected frequencies, the second coherent electromagnetic energy being directed substantially vertically and thereby substantially parallel to gravitational force at the ensemble of quantum objects to excite the quantum objects within the ensemble; (d) a mechanism for thereafter inducing transitions between internal levels of quantum objects of the ensemble by applying third coherent electromagnetic energy in pulse form of a third preselected area, third duration, third polarization, and a third frequency difference sweep range, the third coherent electromagnetic energy being generated by the mixing of at least two electromagnetic waves of third frequency difference sweep range, the third coherent electromagnetic energy being directed at the ensemble of quantum objects to excite quantum objects within the ensemble; and (e) a mechanism for thereafter observing the internal states of the quantum object to reach a conclusion about a change in velocity of the quantum objects induced by external force.

According to another embodiment, an apparatus for measuring gravitational acceleration of a quantum object comprises (a) structure for providing an ensemble of quantum objects of a first preselected velocity range by preparing an ensemble of quantum objects of a first internal state with a mean velocity being directed substantially vertically and thereby substantially parallel to gravitational force; (b) a mechanism for thereafter inducing transitions between distinct internal levels of selected ones of the quantum objects by applying first coherent electromagnetic energy in pulse form of a first pulse area, a first duration, a first polarization, and a first frequency difference sweep range, the first coherent electromagnetic energy being directed substantially vertically and thereby substantially parallel to gravitational force at the ensemble of quantum objects to excite quantum objects within the ensemble; (c) a mechanism for thereafter inducing transitions between distinct internal levels of quantum objects of the ensemble by applying second coherent electromagnetic energy in pulse form of a second preselected area, second duration and second polarization, and a fixed frequency difference, the second coherent electromagnetic energy being generated by the mixing of at least two electromagnetic waves of preselected frequencies, the second coherent electromagnetic energy being directed substantially vertically and thereby substantially parallel to gravitational force at the ensemble of quantum objects to excite the quantum objects within the ensemble; (d) a mechanism for thereafter inducing transitions between internal levels of quantum objects of the ensemble by applying third coherent electromagnetic energy in pulse form of a third preselected area, third duration, third polarization, and a third frequency difference sweep range, the third coherent electromagnetic energy being generated by the mixing of at least two electromagnetic waves of third frequency difference sweep range, the third coherent electromagnetic energy being directed at the ensemble of quantum objects to excite quantum objects within the ensemble; and (e) a mechanism for thereafter observing the internal states of the quantum object to reach a conclusion about a change in velocity of the quantum objects induced by external force.

Another aspect is directed to a method for preparing a controlled ensemble of quantum objects of defined velocity and velocity distribution. The method may comprise preparing an ensemble of quantum objects to a substantially uniform predetermined internal state, and inducing transitions between internal levels of selected ones of the quantum objects by applying coherent electromagnetic energy in pulse form of preselected area, duration, and polarization, the electromagnetic energy being generated by the mixing of at least two electromagnetic waves of time-varying frequencies, the selected ones of the quantum objects being classified by being within a narrow preselected velocity range within the ensemble.

In one example of such a method, the preparing step comprises cooling the ensemble to near absolute zero temperature.

According to another embodiment, a method for preparing a controlled ensemble of quantum objects of defined velocity and velocity distribution comprises preparing an ensemble of quantum objects to a substantially uniform predetermined internal state, and inducing transitions between internal levels of selected ones of the quantum objects by applying coherent electromagnetic energy in pulse form of preselected area, duration and polarization, the electromagnetic energy being generated by the mixing of at least two electromagnetic waves of time-varying frequencies, the selected ones of the quantum objects being classified by being within a narrow preselected velocity range within the ensemble.

In one example of such a method, the preparing step comprises cooling the ensemble to near absolute zero temperature.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Aspects and embodiments are directed to methods and apparatus for coherent atomic population transfer using coherent laser beam pairs. Unlike conventional techniques using Raman or Bragg pulses in which the two laser beams are prepared with fixed frequencies and with a fixed frequency difference, aspects and embodiments use laser beam pairs in which the frequency difference is swept over time (referred to as frequency sweeps). As discussed further below, this optical Adiabatic Rapid Passage (ARP) method, referred to herein as Raman chirped adiabatic passage (RCAP), is analogous to the adiabatic rapid passage techniques used in nuclear magnetic resonance (NMR) spectroscopy. Practical applications of atom interferometry may benefit from robust atom optics based on Raman chirped adiabatic passage.

Raman pulse physics is precisely isomorphic to pulsed nuclear magnetic resonance (NMR). Aspects and embodiments leverage this isomorphism to apply the adiabatic rapid passage (ARP) technique to atom optics, and implement RCAP atom optics by sweeping the difference frequency of far-detuned Raman lasers.

In ARP, a slow sweep of the radio frequency (RF) frequency preserves the initial angle between the drive field and magnetization vector, thereby allowing efficient population inversion and production of coherences. An atom subject to coherent laser beam pairs is analogous to a classical magnetization subjected to an RF magnetic field of fixed frequency. In this case, the fixed frequency corresponds to the frequency difference between the coherent laser beams in the pair. Accordingly, a Raman pulse can be considered as an RF field of constant frequency effectively torqueing the classical magnetization about its axis. Extending the NMR analogy, aspects and embodiments demonstrate atom interferometry with ARP through the application of coherent laser beams with a time-varying (swept) frequency difference. By sweeping the Raman difference frequency, the orientation of the effective RF field varies continuously on the Bloch sphere. In one example, the rate of frequency variation is slow (e.g., the ARP frequency sweeps are significantly longer in duration than Raman pulses) such that the rate of change of frequency, divided by the frequency, is much less than the rate of precession about the effective drive field. Under these conditions, the magnetization maintains a fixed angle with respect to the RF field. As the effective RF field changes orientation, so does the magnetization.

Figure 1:
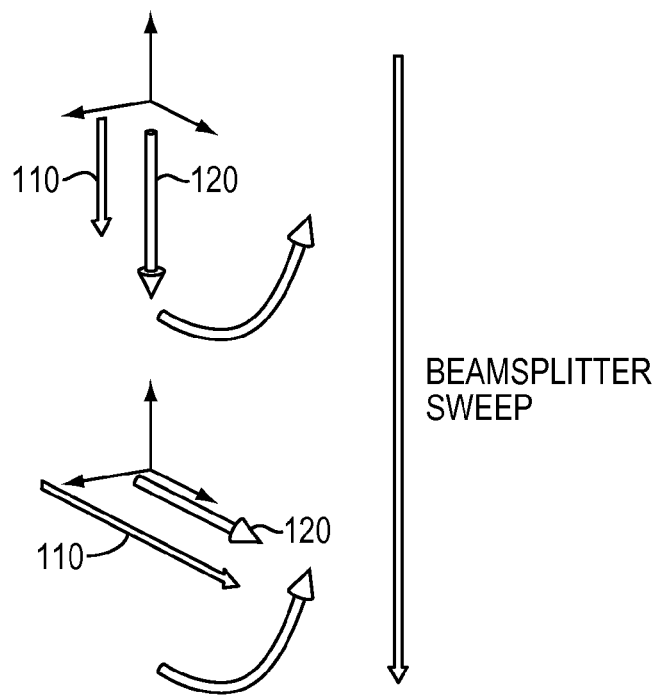
FIG. 1 is a diagram schematically illustrating movement of a polarization on the Bloch sphere caused by rotating the effective drive field according to aspects of the invention.

Referring to FIG. 1, and applying the NMR analogy to the atom, at the start of a frequency sweep, the effective drive field 110 is aligned with the initial polarization 120 of the atomic system. As the effective drive field 110 rotates (changes orientation on the Bloch sphere as a result of the time-varying frequency difference), the polarization 120 follows the effective drive field. The drive field may be turned off in the equatorial plane, resulting in an atomic beamsplitter.

Figure 2:
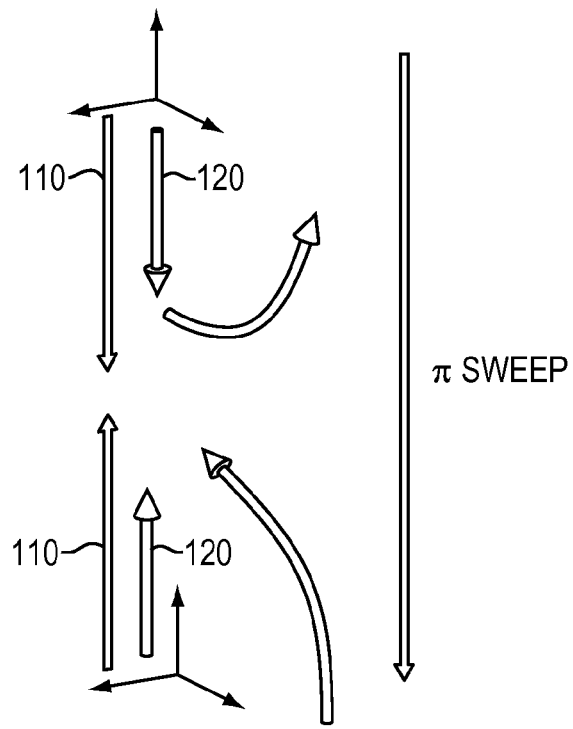
FIG. 2 is a diagram further schematically illustrating that rotation of the effective drive field produces efficient coherent transfer of atomic population from one ground state to another, according to aspects of the invention.

FIG. 2 illustrates how the sweep of FIG. 1 can be continued to the opposite pole, thus comprising an inversion sweep that produces efficient coherent transfer of atomic population from one ground state to another.

Figure 3:
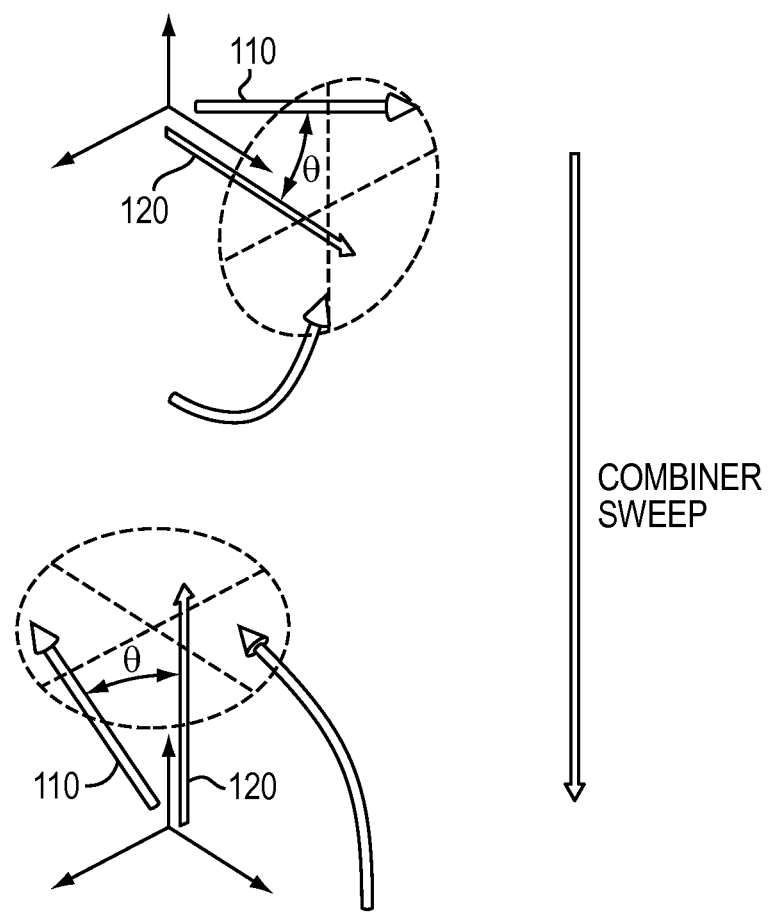
FIG. 3 is a diagram schematically illustrating a combiner frequency sweep in which rotation of the effective drive field causes polarization movement on the Bloch sphere according to aspects of the invention.

FIG. 3 illustrates a combiner sweep, in which the effective drive field 110 is initially on the equatorial plane of the Bloch sphere, at an angle 8 with a polarization 120 that is also oriented in the equatorial plane. As the effective drive field 110 rotates, the polarization 120 precesses about the drive field, but their relative angle of orientation 8 is preserved. When the drive field 110 rotates to polar orientation, the polarization 120 is oriented at an angle 8 with respect to the pole. Measuring the atom's relative ground state population thus reveals the relative phase of the initial polarization with respect to the initial effective drive field.

Figure 4A:
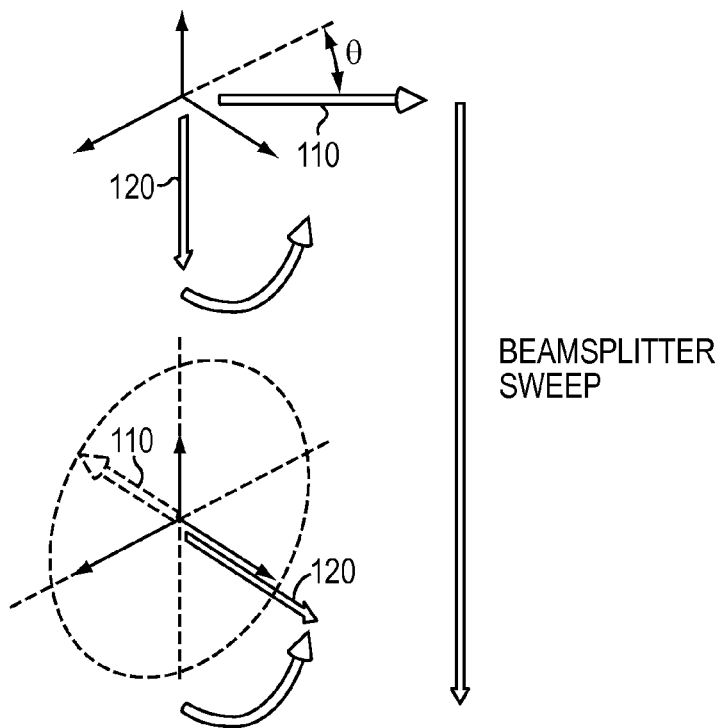
FIG. 4A is a diagram schematically illustrating an RCAP beamsplitter frequency sweep applied to an atomic coherence, according to aspects of the invention.
Figure 4B:
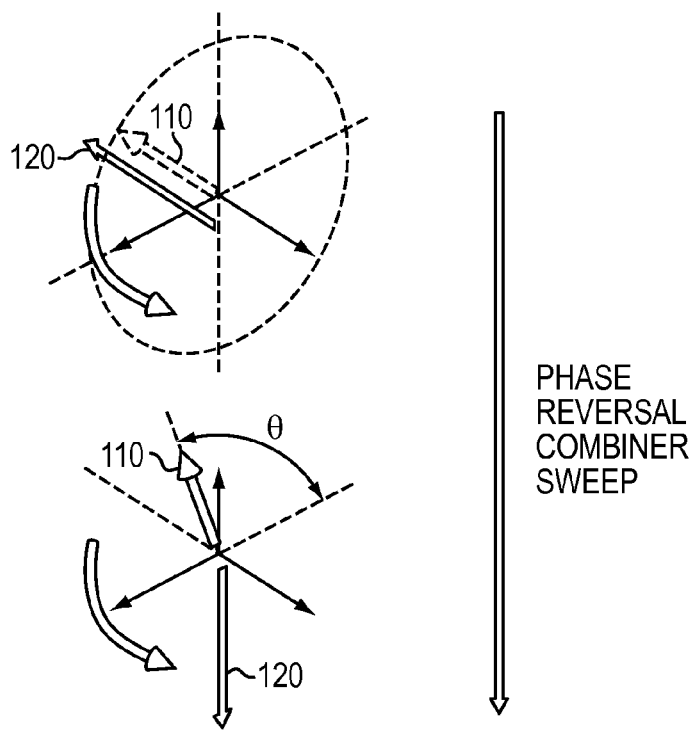
FIG. 4B is a diagram schematically illustrating a phase reversal combiner frequency sweep applied to the polarization produced by the beamsplitter sweep of FIG. 4A, according to aspects of the invention.

FIGS. 4A and 4B illustrate a sequence of two concatenated sweeps which taken together will be referred to as a mirror sweep. FIG. 4A illustrates application of an effective drive field 110 initially in a polar orientation, to a polarization 120 oriented in the equatorial plane at an angle θ with respect to the axis of rotation of the drive field. The drive field rotates into the equatorial plane. The polarization precesses about the drive field at a rate proportional to the drive field strength, and ends up in the plane normal to the drive field and containing the drive field rotation axis. The orientation of the polarization 120 in that plane is determined by the effective drive field strength and the duration of the sweep. The phase of the drive field 110 is then incremented by π, as depicted in FIG. 4B, and swept back to its original polar orientation. The field strength and sweep duration are substantially the same as those used in the first sweep. The polarization thus precesses through the same angle about the drive field 110 as during the first sweep, but in the opposite sense, so that its final orientation is in the equatorial plane at the angle θ with respect to the axis of orientation as shown. Thus, the polarization 120 has been "mirrored" in the equatorial plane with respect to the polarization axis of rotation.

The beamsplitter, inversion, combiner, and minor sweeps of FIGS. 1-4B may be combined together or with standard Raman pulses to implement a variety of atom interferometers. As a method of improving efficiency, the intensity of the Raman lasers may be systematically varied during the sweeps described above. However, it is to be appreciated that intensity variation is not an intrinsic requirement of the above-discussed methods.

Adiabatic rapid passage may impart smaller phase errors and may address broader thermal velocity distributions than conventional pulsed techniques for atom interferometry. In addition, RCAP may permit implementation of atom interferometer inertial sensors of improved ability to accommodate highly dynamic environments. Methods of RCAP according to various embodiments may yield atom optics with reduced sensitivity to variations in the Raman laser intensity and two-photon detuning. As discussed above, the standard beamsplitter technique using fixed-frequency Raman pulses is sensitive to Doppler-induced detunings that can produce phase errors in dynamic environments. In addition, a primary purpose of a Raman pulse is to accurately imprint the laser phase on the phase of the atomic coherence, and if the pulse is applied off resonance, substantial phase errors may result. This sensitivity may be avoided by using RCAP in lieu of a standard Raman pulse beamsplitter. Specifically, phase errors caused by AC Stark shifts may be greatly reduced by use of RCAP.

As discussed above, another method of stimulated Raman adiabatic passage (STIRAP) includes applying two resonant Raman beams with separate time-varying intensities to achieve varying orientation of the effective "RF field." However, variation of intensity poses significant control and stability problems. In contrast, aspects and embodiments of the present invention use laser frequency variation to effect the adiabatic transfer, circumventing the problems associated with varying the laser intensity. Precision control of laser power (intensity) is far more difficult than precision control of laser frequency. Moreover, use of a far off resonant laser source for the tipping field according to one embodiment permits implementation of either a mirror sweep as discussed above with reference to FIGS. 4A and 4B, or a standard Raman mirror pulse in interferometer applications. There is presently no mechanism for implementing a mirror function with STRAP. Thus, STRAP-only interferometers realize reduced interferometer contrast as compared to RCAP or Raman-based interferometers. RCAP atom optics according to various embodiments may provide many of the benefits afforded by the varied laser intensity method discussed above, but with few of its drawbacks.

EXAMPLES

The function and advantages of these and other embodiments will be more fully understood from the following examples. These examples are intended to be illustrative in nature and are not to be considered as limiting the scope of the systems and methods discussed herein. The following examples demonstrate atom interferometry with Raman chirped adiabatic passage sweeps using the apparatus described in *Light pulse atom interferometry at short inter-* rogation times, Butts et al., JOSA B Vol. 28, pp 416-421 (2011), which is herein incorporated by reference in its entirety.

In particular, cesium atoms from a background vapor are trapped in 400 milliseconds (ms) in a magneto-optic trap (MOT). The atoms are trapped in a small octagonal glass cell (2.75 inches in diameter and 1.5 inches thick) where the background pressure is approximately $10^{-8}$ torr. The MOT beams, of diameter 10 mm ($1/e^2$) and intensity $10/_{sat}$ ($I_{sat}$=1.10 mW/cm$^2$), are detuned by 12 MHz from the $|6S_{1/2}F=4\rangle \rightarrow |6P_{3/2}F'=5\rangle$ cycling transition. To prevent population from accumulating in the F=3 manifold, the trapping light is overlapped with repump light resonant with the F=3→F'=4 transition. Additional cooling and state preparation yields a cloud of >$10^7$ atoms in the $|F=3; m_F=0\rangle$ ground state with temperature <10 µK, in a uniform field of 0.5 G.

Example 1

Two Sweep Interferometer Sequences

This example includes laboratory demonstration of atom interferometry with RCAP sweeps in a two-pulse interferometry sequence using the above-mentioned apparatus. Atom interferometry was done using two-photon transitions between the $|F=3; m_F=0\rangle$ and $|F=4; m_F=0\rangle$ hyperfine levels. The Raman beam was locked at 2.2 Gigahertz (GHz) above the single-photon resonance, and was passed through an electro-optic modulator (EOM) to create sidebands. Phase modulating the EOM at the hyperfine splitting frequency produced two carrier-sideband pairs, one of which drove the dominant Raman transition in our experiments. The modulated beam carried both Raman frequency components and was circularly polarized to ensure velocity insensitive (co-propagating) transitions. Finally, an arbitrary waveform generator controlled the pulse timing and frequency sweeps for the RCAP process.

Figure 5A:
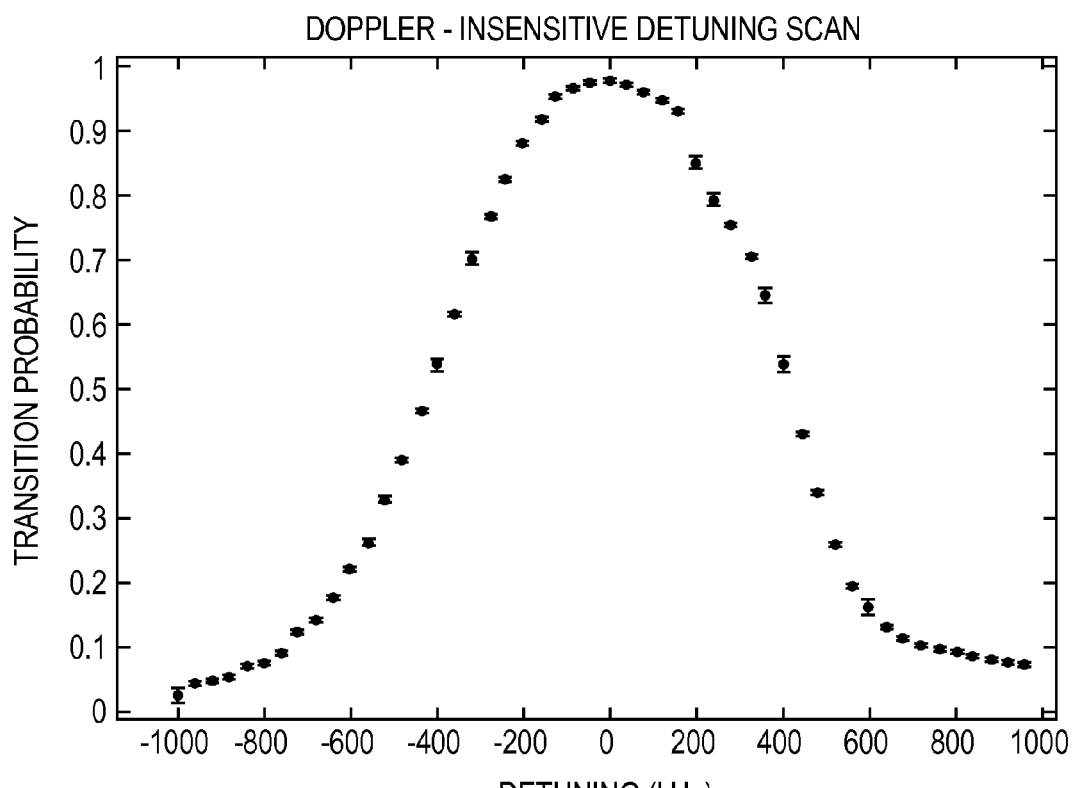
FIG. 5A is a graph illustrating population transfer as a function of the deviation of the center frequencies of pole-to-pole RCAP sweeps from the Raman resonance according to aspects of the invention.

FIG. 5A presents population transfer as a function of the deviation of the center frequency of the sweep from the Raman resonance. In this example, sweep range and duration were fixed. To reduce spontaneous emission losses, Raman laser powers were ramped to zero near the beginning and end of the frequency sweeps. The Rabi rate was 96 kilohertz (kHz), and the total sweep duration was 50 microseconds (µs), and the sweep range was 20 Megahertz (MHz). On-resonant population transfer was nearly 98%.

Figure 5B:
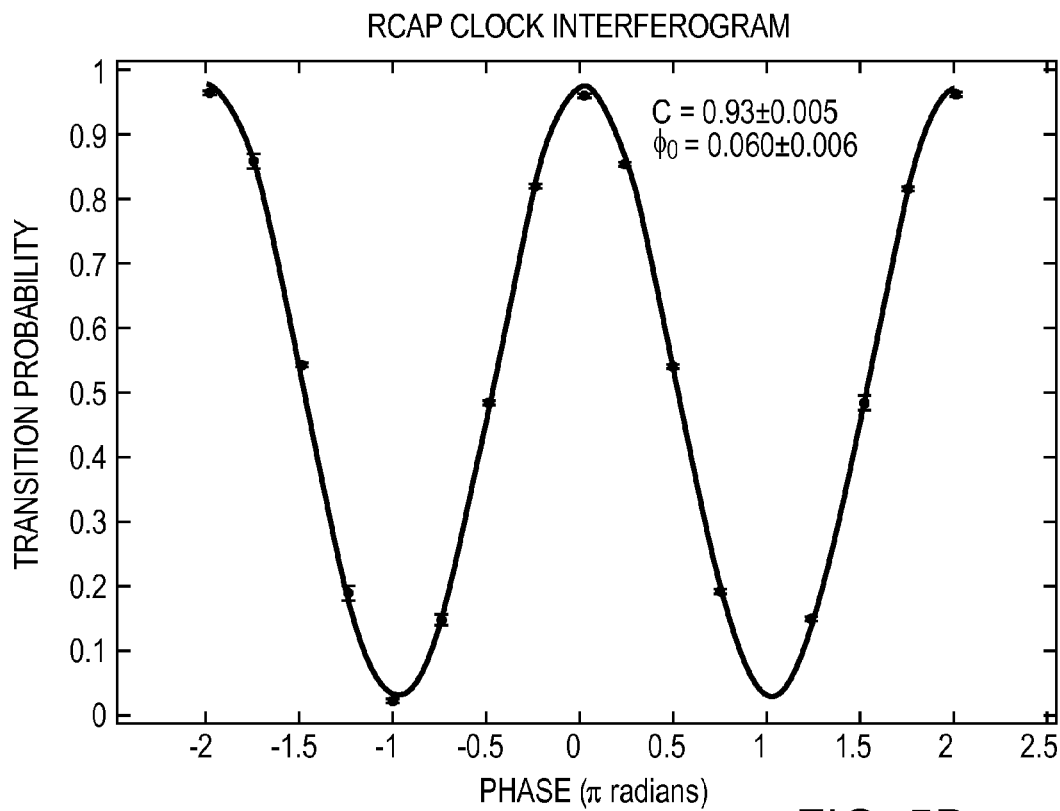
FIG. 5B is a graph of transition probability (representing population transfer) as a function of the phase of a second 50 μs RCAP combiner sweep with respect to the phase of a first 50 μs RCAP beamsplitter sweep according to aspects of the invention.

FIG. 5B shows fringes obtained from a Ramsey interrogation sequence comprising a 50 µs RCAP beamsplitter sweep (first sweep), a 200 µs dwell time in which the internal atomic state evolved in the dark, and a 50 µs RCAP combiner sweep (second sweep) applied with systematically variable phase relative to the first RCAP sweep. A Rabi rate of 100 kHz, and a sweep range of 20 MHz, was used for both sweeps. Population transfer (transition probability) is plotted as a function of the phase of the second sweep with respect to the first. The RCAP interferometer achieved 93% contrast, indicating that spontaneous emission is not a limiting effect for these experimental parameters.

Figure 6:
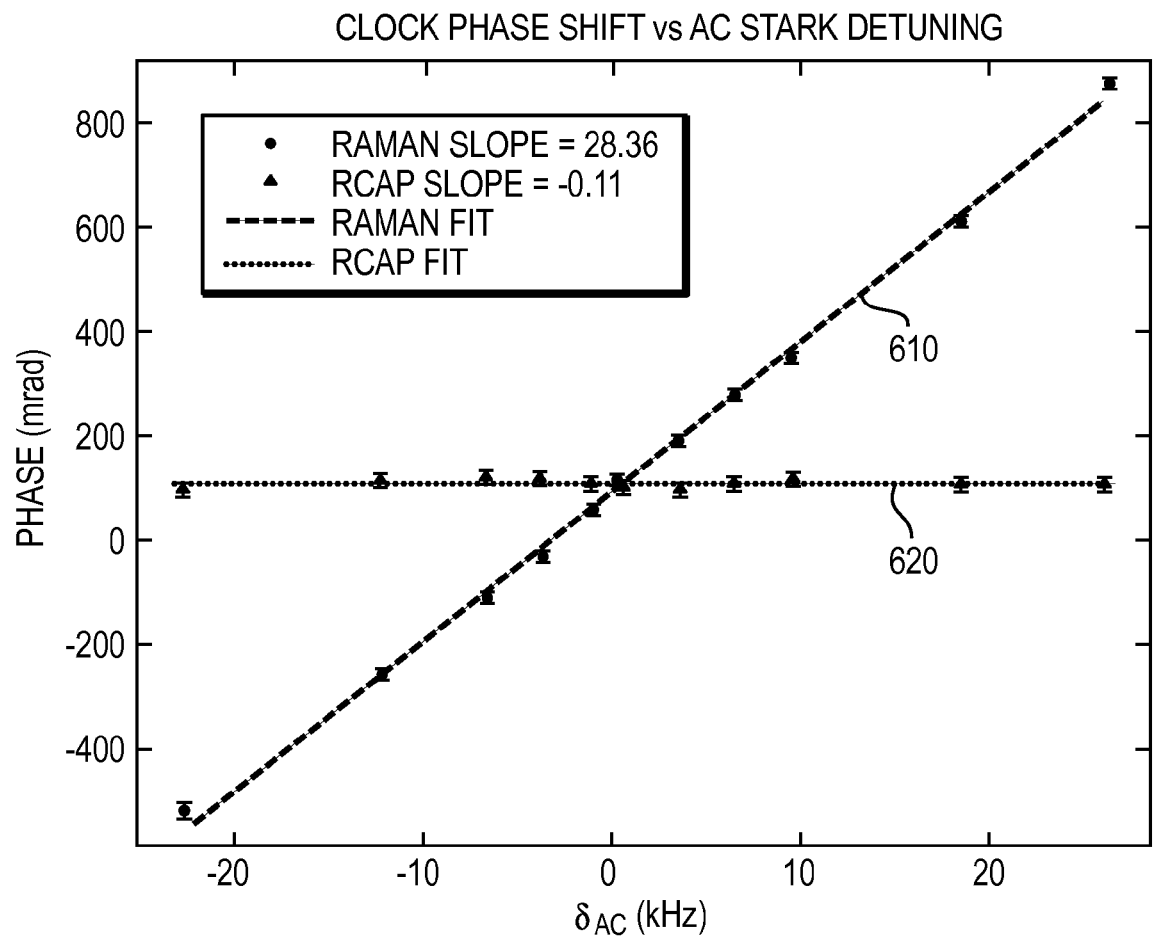
FIG. 6 is a graph of the phases of interferograms, relative to the phase at the resonant frequency, as a function of the sweep center frequency from the atomic resonance, for a series of two-sweep Ramsey interrogation sequences made with off-resonant drive fields according to aspects of the invention.

FIG. 6 summarizes the results of a series of two-sweep Ramsey interrogation sequences made with off-resonant drive fields, in which the deviation from resonance was induced by deliberately imposed AC Stark shifts. A Rabi rate of 68 kHz was used in generating these fringe patterns; the sweep range was 20 MHz, and the sweep duration was 100 µs. FIG. 6 is a plot of the phases of the interferograms, relative to that obtained at the resonant frequency, as a function of the difference of the sweep center frequency from the atomic resonance. As noted above, the deviation from resonance was induced by controlled adjustment of AC Stark shifts. In one set of measurements, Raman pulses were used for the beamsplitter/combiner pair (trace 610); in the other, RCAP sweeps were used (trace 620). The phase of the Raman pulse interferometer (trace 610) was strongly affected by variation in AC Stark shift, showing a linear variation of 28 milliradians per kHz (mrad/kHz). The slope of the RCAP interferometer phase (trace 620) versus the AC Stark shift was –0.11 mrad/kHz, showing that the RCAP interferometer was 250 times less sensitive to AC Stark shift than the Raman pulse interferometer. Given the fact that the AC Stark shift is a serious source of error in Raman pulse interferometry, it is noteworthy that use of RCAP sweeps essentially eliminates its effect on interferometer phase in the two-sweep example.

Example 2

Three Sweep Interferometer Sequence

This example demonstrates atom interferometry with RCAP sweeps in a three-event interferometry sequence with a velocity-sensitive (counter-propagating) Raman beam configuration. As discussed above, the apparatus described in *Light pulse atom interferometry at short interrogation times*, Butts et al., JOSA B 28, pp 416-421 (2011) was used. As was the case in Example 1, in this example, a Raman master laser was locked at 2.2 GHz above the single-photon resonance, and was passed through an electro-optic modulator (EOM) to create sidebands. Phase modulating the EOM at the hyperfine splitting frequency produced multiple sidebands in addition to the input laser frequency. The modulated beam was applied to two slave lasers, each tuned to principally amplify one of the frequencies required to form a Raman beam pair. The outputs of the slave lasers were applied to oppositely directed optical collimators, which produced counter-propagating Raman laser beams aligned to the magnetic field axis. As in Example 1, an arbitrary waveform generator controlled the pulse timing and frequency sweeps for the RCAP process.

Figure 7A:
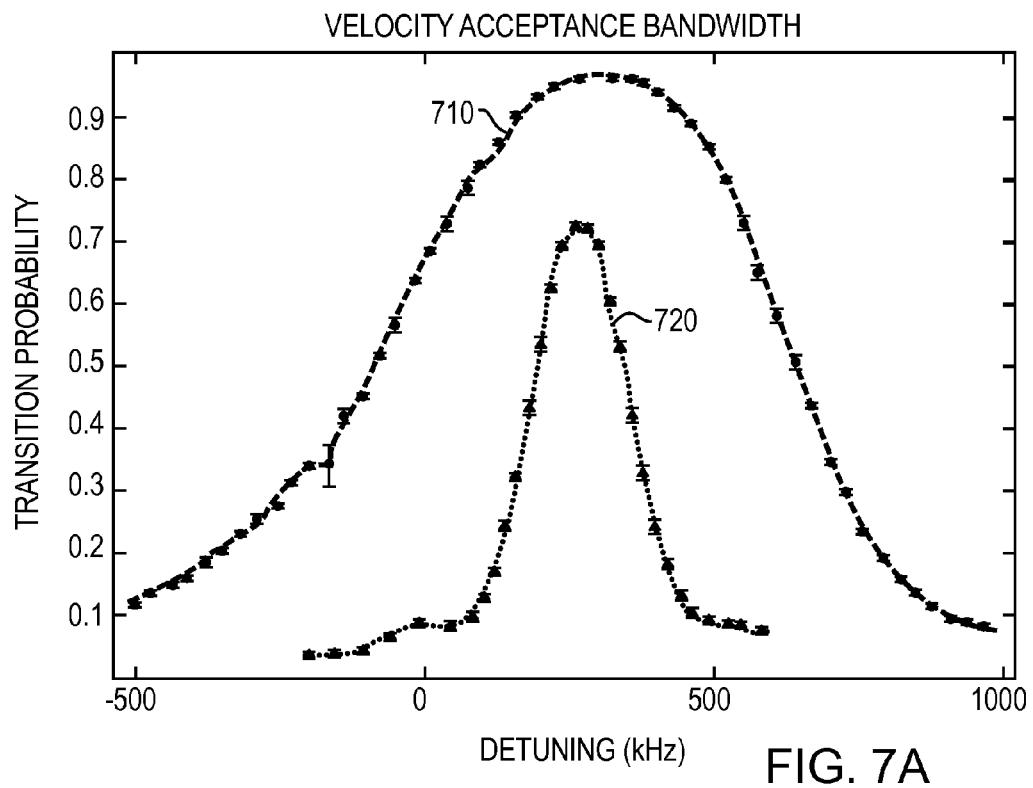
FIG. 7A is a graph illustrating population transfer for series of RCAP π sweeps using counterpropagating laser beams, according to aspects of the invention, and for a conventional Raman pulse using counterpropagating laser beams.

Population transfer is illustrated in FIG. 7A. A series of RCAP π sweeps, of duration 44 µs with a Rabi frequency of 103 kHz, was applied at a series of sweep center frequency values. The RCAP π sweep applied with center frequency at the Raman resonance resulted in transfer of 96% of the population, loss being primarily due to spontaneous emission. The atom cloud temperature exceeded 7 µK; no velocity selection was applied. Such losses may be reduced by using larger laser detunings, higher laser power, and lower atom temperature. Population transfer resulting from the RCAP sweep is shown as trace 710 in FIG. 7A. Population transfer resulting from application of a standard Raman pulse is shown as trace 720 in FIG. 7A. The RCAP sweep transfer greatly exceeded the 72% transfer produced by the standard Raman pulse, also shown in FIG. 7A. Also, the net transfer of the RCAP sweep was less sensitive to deviations from resonance than was that of the Raman pulse.

An important application of a highly efficient π sweep would be as an "augmentation" pulse in a Large Momentum Transfer (LMT) atom interferometer sequence. Demonstration of Raman LMT interferometry was first presented in *Large area light-pulse atom interferometry*, McGuirk et al., Phys. Rev. Lett. 85, pp. 4498-4501 (2000), which is herein incorporated by reference in its entirety. "Augmentation" pulses are additional pulses applied between the three pulses of an interferometer sequence, that serve to increase interferometer sensitivity as described in McGuirk et al. McGuirk et al. used standard Raman π pulses as augmentation pulses to achieve increased sensitivity. However, Raman π pulses achieve substantially less transfer efficiency than RCAP sweeps, as discussed above and shown in FIG. 7A. Thus, it is expected that much higher contrast LMT interferometers may be implemented with RCAP sweeps providing large area augmentation in lieu of Raman π pulses.

Figure 7B:
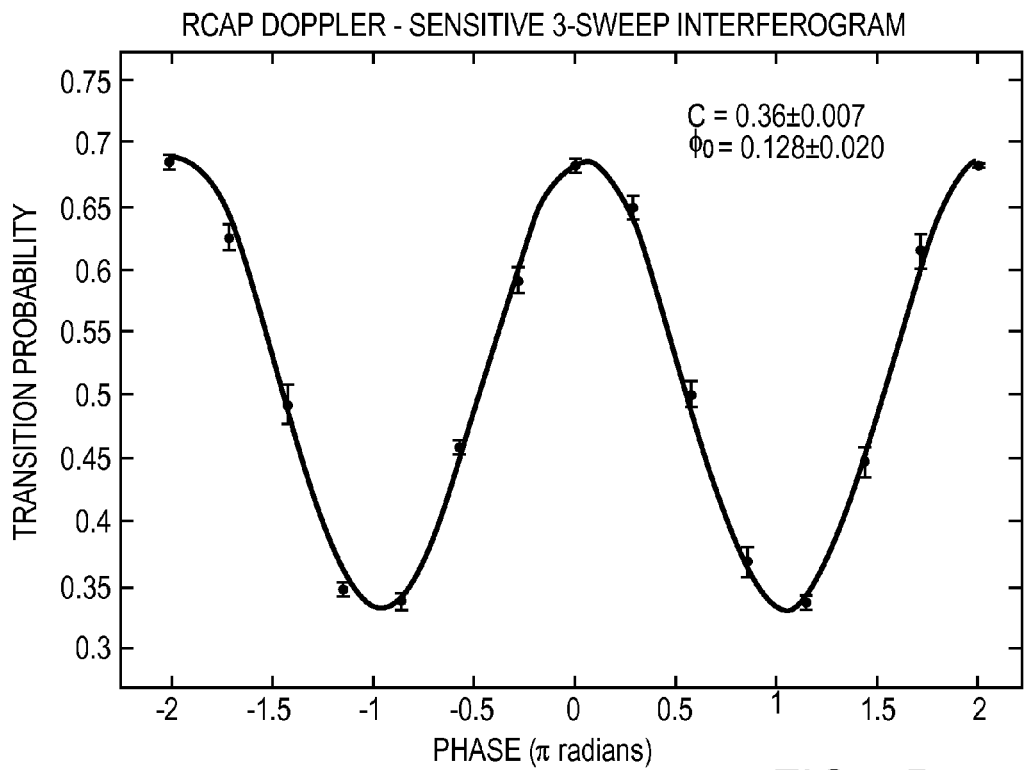
FIG. 7B is a graph illustrating fringes obtained from a three sweep interrogation sequence according to aspects of the invention.

FIG. 7B shows fringes obtained from a three sweep interrogation sequence comprising a 20 μs RCAP beamsplitter sweep, a 40 μs RCAP mirror sweep, and a 20 μs RCAP combiner sweep, with a 2 ms dwell time between pulses. The RCAP interferometer achieved 36% contrast.

Figure 7C:
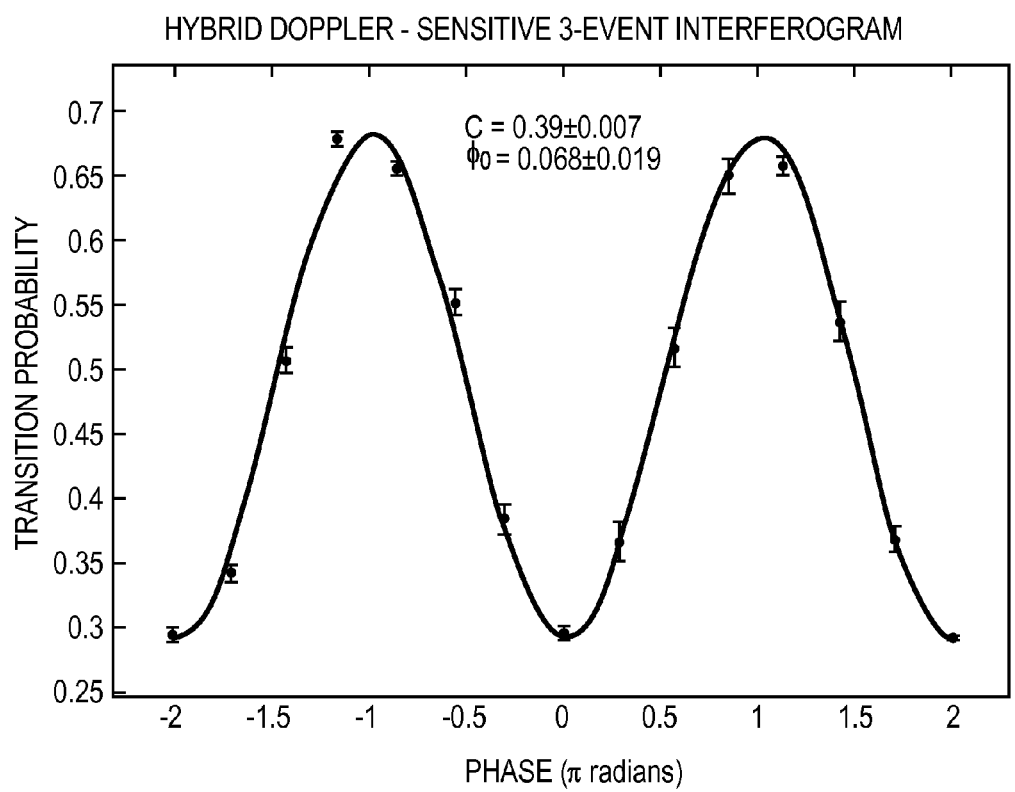
FIG. 7C is a graph illustrating fringes obtained from a hybrid three-event interrogation sequence, according to aspects of the invention.

FIG. 7C shows fringes obtained from a hybrid three-event interrogation sequence in which the first event was a 20 μs RCAP beamsplitter sweep, the second event was a constant-frequency Raman π pulse of 5.75 μs, and the third event was a 20 μs RCAP combiner sweep. The hybrid interferometer achieved 39% contrast.

In both of these demonstrations, the Rabi rate was 86 kHz, the range of the frequency sweep was 20 MHz, and 7 μK atoms were used. For comparison, we note that an all-Raman pulse interferometer produced 48% contrast under the same operating conditions.

The above-discussed examples and experimental results with Raman chirped adiabatic passage demonstrate efficient coherent population transfer and high-contrast interference effects with minimal phase errors in both Doppler-insensitive two-sweep interrogations (applicable to precision timing) and in Doppler-sensitive three sweep interrogations (applicable to inertial sensing). A Doppler-sensitive Mach-Zender style interferometer in which the first event was a RCAP beamsplitter sweep, the second (mirror) event was an ordinary Raman pulse, and the third event was a RCAP combiner, also shows good contrast, as discussed above with reference to FIG. 7C, and demonstrates the feasibility of hybrid Raman pulse/RCAP sweep interferometry.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. The methods and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only.

What is claimed is:

1. A method for controllably translating an atom comprising:
providing an effective drive field derived from mixing a pair of electromagnetic waves of first and second time-varying frequencies having a time-varying frequency difference between the first and second time-varying frequencies to generate a coherent electromagnetic energy of a third time-varying frequency;
applying and directing the coherent electromagnetic energy pulse form of preselected area, duration, polarization, and time-dependent frequency difference sweep range at the atom thereby inducing adiabatic Raman transitions between two distinct internal quantum levels in the atom to change momentum of the atom;
observing the internal quantum state of the atom to determine the momentum of the atom; and
determining a velocity of the atom based on the momentum of the atom.

2. The method of claim 1, further comprising directing the pair of electromagnetic waves along a collinear path to the atom.

3. The method of claim 1, wherein applying the coherent electromagnetic energy includes applying the coherent electromagnetic energy in temporal pulse form to the atom.

4. The method of claim 3, wherein the atom is substantially stationary relative to the position of the coherent electromagnetic energy.

5. The method of claim 4, further comprising cooling the atom to render the atom substantially stationary.

6. The method of claim 1, wherein applying and directing the coherent electromagnetic energy includes:
applying and directing a first pulse of the coherent electromagnetic energy having a first preselected area, first duration, first polarization, and first time-dependent frequency difference sweep range, wherein the first polarization has an initial polar orientation and rotates to an equatorial plane during the first duration; and
after a dwell time, applying a second pulse of the coherent electromagnetic energy having a second preselected area, second duration, second polarization, and second time-dependent frequency difference sweep range, wherein the second polarization is initially oriented on the equatorial plane and rotates to a polar orientation during the second duration.

7. The method of claim 6, wherein the first pulse of the coherent electromagnetic energy acts on the atom as an atomic beamsplitter; and
wherein the second pulse of the coherent electromagnetic energy acts on the atom as an atomic combiner.

8. The method of claim 6, further comprising, during the dwell time, incrementing a phase of the effective drive field by π; and
wherein the second preselected area is approximately equal to the first preselected area, and the second duration is approximately equal to the first duration.

9. The method of claim 1, wherein applying and directing the coherent electromagnetic energy includes configuring and applying the effective drive field to act as an atomic combiner on the atom.

10. The method of claim 1, wherein applying and directing the coherent electromagnetic energy includes configuring and applying the effective drive field to act as an atomic combiner on the atom, including rotating the polarization of the effective drive field by 90 degrees during, the preselected duration of the pulse form of the coherent electromagnetic energy.

11. A method of measuring changes in velocity of an atom comprising steps of:
(a) providing an ensemble of atoms of a first preselected velocity range by preparing an ensemble of atoms of a first internal state;
(b) thereafter inducing transitions between distinct internal levels of selected ones of the atoms by applying an effective drive field including first coherent electromagnetic energy in pulse form of a first pulse area, a first duration, a first polarization, and a first frequency difference sweep range, the first coherent electromagnetic energy being generated by mixing at least two electromagnetic waves having a time-varying frequency difference between them, the first coherent electromagnetic energy being directed at the ensemble of atoms to excite atoms within the ensemble;

(c) thereafter inducing transitions between distinct internal levels of atoms of the ensemble by applying second coherent electromagnetic energy in pulse form of a second pulse area, a second duration, a second polarization, and a second frequency difference sweep range, the second coherent electromagnetic energy being generated by mixing at least two electromagnetic waves of preselected frequencies and having a time-varying frequency difference, the second coherent electromagnetic energy being directed at, the ensemble of atoms to excite the atoms within the ensemble;

(d) thereafter inducing transitions between internal levels of atoms of the ensemble by applying third coherent electromagnetic energy in pulse form of a third preselected area, third duration, third polarization, and a third frequency difference sweep range, the third coherent electromagnetic energy being generated by mixing at least two electromagnetic waves having a time-varying frequency difference between them, the third coherent electromagnetic energy being directed at the ensemble of atoms to excite atoms within the ensemble; and (e) thereafter observing the internal states of the atom to determine their momentum and measure the change in velocity of the atoms induced by an external force.

12. The method of claim 11, wherein step (c) comprises applying the second coherent electromagnetic energy in pulse form of the second pulse area, the second duration and the second polarization, and a fixed frequency difference.

13. The method of claim 12, further comprising measuring gravitational acceleration of the atom, wherein
step (a) includes preparing the ensemble of atoms of the first internal state with a mean velocity being directed substantially vertically and thereby substantially parallel to gravitational force;
step (b) includes directing the first coherent electromagnetic energy substantially vertically and thereby substantially parallel to the gravitational force; and
step (c) further includes directing the second coherent electromagnetic energy substantially vertically and thereby substantially parallel to the gravitational force.

14. The method of claim 11, further comprising measuring gravitational acceleration of the atom, wherein
step (a) includes preparing the ensemble of atoms of the first internal state with a mean velocity being directed substantially vertically and thereby substantially parallel to gravitational force;
step (b) includes directing the first coherent electromagnetic energy substantially vertically and thereby substantially parallel to the gravitational force; and
step (c) includes directing the second coherent electromagnetic energy substantially vertically and thereby substantially parallel to the gravitational force.

15. A method of preparing a controlled ensemble of atoms of defined velocity and velocity distribution comprising;
preparing an ensemble of atoms to a substantially uniform predetermined internal state; inducing transitions between internal levels of selected ones of the atoms by applying a first pulse of coherent electromagnetic energy generated from mixing pair of electromagnetic waves having a time-varying frequency difference, the first pulse of coherent electromagnetic energy having a first preselected area, first duration, first polarization, and first time-dependent frequency difference sweep range, wherein the first polarization has an initial polar orientation and rotates to an equatorial plane during the first duration; and
after a dwell time, applying a second pulse of coherent electromagnetic energy generated from mixing a pair of electromagnetic waves having a time-varying frequency difference, the second pulse of coherent electromagnetic energy having a second preselected area, second duration, second polarization, and second time-dependent frequency difference sweep range, wherein the second polarization is initially oriented on the equatorial plane and rotates to a polar orientation during the second duration, the selected ones of the atoms being classified by being within a preselected velocity range within the ensemble.

16. The method of claim 15, wherein preparing the ensemble of atoms includes cooling the ensemble to near absolute zero temperature.

* * * * *

UNITED STATES PATENT AND TRADEMARK OFFICE
CERTIFICATE OF CORRECTION

PATENT NO. : 9,257,206 B2  
APPLICATION NO. : 13/688429  
DATED : February 9, 2016  
INVENTOR(S) : Richard E. Stoner et al.

Page 1 of 1

It is certified that error appears in the above-identified patent and that said Letters Patent is hereby corrected as shown below:

In the Specification

Column 12, line 7, replace "minor" with --mirror--

Column 12, line 51, replace both instances of "STRAP" with --STIRAP--

In the Claims

Column 16, claim 1, line 2, insert --in-- between "energy" and "pulse form"

Column 16, claim 9, line 51, replace "combiner" with --beamsplitter--

Signed and Sealed this  
Tenth Day of May, 2016

Michelle K. Lee  
*Director of the United States Patent and Trademark Office*